(12) United States Patent
Jackson (10) Patent No.: US 8,572,253 B2
(45) Date of Patent: *Oct. 29, 2013

(54) SYSTEM AND METHOD FOR PROVIDING DYNAMIC ROLL-BACK

(75) Inventor: David Brian Jackson, Spanish Fork, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 80 days.

This patent is subject to a terminal disclaimer.

(21) Appl. No.: 13/205,385

(22) Filed: Aug. 8, 2011

(65) Prior Publication Data

US 2011/0296029 A1     Dec. 1, 2011

Related U.S. Application Data (63) Continuation of application No. 11/208,138, filed on Aug. 19, 2005, now Pat. No. 7,996,455, which is a continuation-in-part of application No. PCT/US2005/021427, filed on Jun. 17, 2005.

(51) Int. Cl.
*G06F 15/173* (2006.01)

(52) U.S. Cl.
USPC .......................................... 709/226; 709/200

(58) Field of Classification Search
USPC ........ 455/424, 422.1, 510, 552.1, 450.1, 434, 455/435.2, 558, 433, 405–407, 455, 466, 455/456.1, 440, 418, 414.1, 550.1, 468; 709/223, 226
See application file for complete search history.

(56) References Cited

U.S. PATENT DOCUMENTS

| | | |
|---|---|---|
| 5,175,800 A | 12/1992 | Gailis et al. |
| 5,307,496 A | 4/1994 | Ichinose et al. |
| 5,355,508 A | 10/1994 | Kan |
| 5,473,773 A | 12/1995 | Aman et al. |
| 5,504,894 A | 4/1996 | Ferguson et al. |
| 5,550,970 A | 8/1996 | Cline et al. |

(Continued)

FOREIGN PATENT DOCUMENTS

| | | |
|---|---|---|
| GB | 2392265 | 2/2004 |
| WO | WO 03/060798 | 9/2003 |
| WO | WO 2004/021109 | 3/2004 |
| WO | WO 2004/046919 | 6/2004 |

OTHER PUBLICATIONS

Leinberger, W. et al., "Gang Scheduling for Distributed Memory Systems", University of Minnesota—Computer Science and Engineering—Technical Report, Feb. 16, 2000, vol. TR 00-014.

(Continued)

*Primary Examiner* — Adnan Mirza (57) ABSTRACT

A systems, method and computer-readable media are disclosed for providing a dynamic roll-back reservation mask in a compute environment. The method of managing compute resources within a compute environment includes, based on an agreement between a compute resource provider and a customer, creating a roll-back reservation mask for compute resources which slides ahead of current time by a period of time. Within the roll-back reservation mask, the method specifies a subset of consumers and compute resource requests which can access compute resources associated with the roll-back reservation mask and, based on received data, the method dynamically modifies at least one of (1) the period of time the roll-back reservation mask slides ahead of current time and (2) the compute resources associated with the roll-back reservation mask.

20 Claims, 5 Drawing Sheets

(56) References Cited

U.S. PATENT DOCUMENTS

| | | |
|---|---|---|
| 5,826,082 A | 10/1998 | Bishop et al. |
| 5,832,517 A | 11/1998 | Knutsen, II |
| 5,881,238 A | 3/1999 | Aman et al. |
| 5,918,017 A | 6/1999 | Attanasio et al. |
| 5,920,863 A | 7/1999 | McKeehan et al. |
| 5,933,417 A | 8/1999 | Rottoo |
| 5,958,003 A | 9/1999 | Preining et al. |
| 6,003,061 A | 12/1999 | Jones et al. |
| 6,021,425 A | 2/2000 | Waldron, III et al. |
| 6,067,545 A | 5/2000 | Wolff |
| 6,076,174 A | 6/2000 | Freund |
| 6,088,718 A | 7/2000 | Altschuler et al. |
| 6,098,090 A | 8/2000 | Burns |
| 6,101,508 A | 8/2000 | Wolff |
| 6,167,445 A | 12/2000 | Gai et al. |
| 6,212,542 B1 | 4/2001 | Kahle et al. |
| 6,278,712 B1 | 8/2001 | Takihiro et al. |
| 6,298,352 B1 | 10/2001 | Kannan et al. |
| 6,314,555 B1 | 11/2001 | Ndumu et al. |
| 6,324,279 B1 | 11/2001 | Kamanek, Jr. et al. |
| 6,330,008 B1 | 12/2001 | Razdow et al. |
| 6,330,583 B1 | 12/2001 | Reiffin |
| 6,333,936 B1 | 12/2001 | Johansson et al. |
| 6,334,114 B1 | 12/2001 | Jacobs et al. |
| 6,366,945 B1 | 4/2002 | Fong et al. |
| 6,370,154 B1 | 4/2002 | Wickham |
| 6,374,297 B1 | 4/2002 | Wolf et al. |
| 6,418,459 B1 | 7/2002 | Gulick |
| 6,463,454 B1 | 10/2002 | Lumelsky et al. |
| 6,496,566 B1 | 12/2002 | Posthuma |
| 6,496,866 B2 | 12/2002 | Attanasio et al. |
| 6,519,571 B1 | 2/2003 | Guheen et al. |
| 6,526,442 B1 | 2/2003 | Stupek, Jr. et al. |
| 6,564,261 B1 | 5/2003 | Gudjonsson et al. |
| 6,571,215 B1 | 5/2003 | Mahapatro |
| 6,584,489 B1 | 6/2003 | Jones et al. |
| 6,587,938 B1 | 7/2003 | Eilert et al. |
| 6,590,587 B1 | 7/2003 | Wichlman et al. |
| 6,662,202 B1 | 12/2003 | Krusche et al. |
| 6,662,219 B1 | 12/2003 | Nishanov et al. |
| 6,687,257 B1 | 2/2004 | Balasubramanian |
| 6,690,400 B1 | 2/2004 | Moayyad et al. |
| 6,760,306 B1 | 7/2004 | Pan et al. |
| 6,771,661 B1 | 8/2004 | Chawla et al. |
| 6,829,762 B2 | 12/2004 | Arimilli et al. |
| 6,912,533 B1 | 6/2005 | Hornick |
| 6,925,431 B1 | 8/2005 | Papaefstathiou |
| 6,938,256 B2 | 8/2005 | Deng et al. |
| 6,948,171 B2 | 9/2005 | Dan et al. |
| 6,966,033 B1 | 11/2005 | Gasser et al. |
| 6,975,609 B1 | 12/2005 | Khaleghi et al. |
| 6,985,937 B1 | 1/2006 | Keshav et al. |
| 7,003,414 B1 | 2/2006 | Wichelman et al. |
| 7,035,230 B1 | 4/2006 | Shaffer et al. |
| 7,072,807 B2 | 7/2006 | Brown et al. |
| 7,124,410 B2 | 10/2006 | Berg et al. |
| 7,143,168 B1 | 11/2006 | DiBiasio et al. |
| 7,145,995 B2 | 12/2006 | Oltmanns et al. |
| 7,168,049 B2 | 1/2007 | Day |
| 7,177,823 B2 | 2/2007 | Lam et al. |
| 7,185,073 B1 | 2/2007 | Gai et al. |
| 7,188,174 B2 | 3/2007 | Rolia et al. |
| 7,191,244 B2 | 3/2007 | Jennings et al. |
| 7,197,561 B1 | 3/2007 | Lovy et al. |
| 7,222,343 B2 | 5/2007 | Heyman et al. |
| 7,236,915 B2 | 6/2007 | Algieri et al. |
| 7,289,619 B2 | 10/2007 | Vivadelli et al. |
| 7,296,268 B2 | 11/2007 | Darling et al. |
| 7,308,687 B2 | 12/2007 | Trossman et al. |
| 7,328,406 B2 | 2/2008 | Kalinoski et al. |
| 7,353,495 B2 | 4/2008 | Somgyi |
| 7,376,693 B2 | 5/2008 | Neiman et al. |
| 7,386,586 B1 | 6/2008 | Headley et al. |
| 7,386,850 B2 | 6/2008 | Mullen |
| 7,403,994 B1 | 7/2008 | Vogl et al. |
| 7,423,971 B1 | 9/2008 | Mohaban et al. |
| 7,502,747 B1 | 3/2009 | Pardo et al. |
| 7,502,884 B1 | 3/2009 | Shah et al. |
| 7,516,455 B2 | 4/2009 | Matheson et al. |
| 7,546,553 B2 | 6/2009 | Bozak et al. |
| 7,568,199 B2 | 7/2009 | Bozak et al. |
| 7,640,547 B2 | 12/2009 | Neiman et al. |
| 7,716,193 B2 | 5/2010 | Krishnamoorthy |
| 2002/0007389 A1 | 1/2002 | Jones et al. |
| 2002/0031364 A1 | 3/2002 | Suzuki et al. |
| 2002/0087699 A1 | 7/2002 | Karagiannis et al. |
| 2002/0099842 A1 | 7/2002 | Jennings et al. |
| 2002/0116234 A1 | 8/2002 | Nagasawa |
| 2002/0120741 A1 | 8/2002 | Webb et al. |
| 2002/0156904 A1 | 10/2002 | Gullotta et al. |
| 2002/0166117 A1 | 11/2002 | Abrams et al. |
| 2003/0005130 A1 | 1/2003 | Cheng |
| 2003/0018766 A1 | 1/2003 | Duvvuru |
| 2003/0018803 A1 | 1/2003 | El Batt et al. |
| 2003/0028645 A1 | 2/2003 | Romagnoli |
| 2003/0061260 A1 | 3/2003 | Rajkumar |
| 2003/0061262 A1 | 3/2003 | Hahn et al. |
| 2003/0088457 A1 | 5/2003 | Keil et al. |
| 2003/0126200 A1 | 7/2003 | Wolff |
| 2003/0131043 A1 | 7/2003 | Berg et al. |
| 2003/0135615 A1 | 7/2003 | Wyatt |
| 2003/0135621 A1 | 7/2003 | Romagnoli |
| 2003/0149685 A1 | 8/2003 | Trossman et al. |
| 2003/0154112 A1 | 8/2003 | Neiman et al. |
| 2003/0158884 A1 | 8/2003 | Alford |
| 2003/0169269 A1 | 9/2003 | Sasaki et al. |
| 2003/0182425 A1 | 9/2003 | Kurakake |
| 2003/0185229 A1 | 10/2003 | Shachar et al. |
| 2003/0200109 A1 | 10/2003 | Honda et al. |
| 2003/0212792 A1 | 11/2003 | Raymond |
| 2003/0216951 A1 | 11/2003 | Ginis et al. |
| 2003/0217129 A1 | 11/2003 | Knittel et al. |
| 2003/0233378 A1 | 12/2003 | Butler et al. |
| 2003/0233446 A1 | 12/2003 | Earl |
| 2004/0030741 A1 | 2/2004 | Wolton et al. |
| 2004/0044718 A1 | 3/2004 | Ferstl et al. |
| 2004/0064817 A1 | 4/2004 | Shibayama et al. |
| 2004/0103339 A1 | 5/2004 | Chalasani et al. |
| 2004/0103413 A1 | 5/2004 | Mandava et al. |
| 2004/0107281 A1 | 6/2004 | Bose et al. |
| 2004/0117768 A1 | 6/2004 | Chang et al. |
| 2004/0139202 A1 | 7/2004 | Talwar et al. |
| 2004/0139464 A1 | 7/2004 | Ellis et al. |
| 2004/0196308 A1 | 10/2004 | Blomquist |
| 2004/0199918 A1 | 10/2004 | Skovira |
| 2004/0205101 A1 | 10/2004 | Radhakrishnan |
| 2004/0215780 A1 | 10/2004 | Kawato |
| 2004/0216121 A1 | 10/2004 | Jones et al. |
| 2004/0236852 A1 | 11/2004 | Birkestrand et al. |
| 2004/0244006 A1 | 12/2004 | Kaufman et al. |
| 2004/0260746 A1 | 12/2004 | Brown et al. |
| 2005/0027864 A1 | 2/2005 | Bozak et al. |
| 2005/0050270 A1 | 3/2005 | Horn et al. |
| 2005/0071843 A1 | 3/2005 | Guo et al. |
| 2005/0155033 A1 | 7/2005 | Luoffo et al. |
| 2005/0163143 A1 | 7/2005 | Kalantar et al. |
| 2005/0228892 A1 | 10/2005 | Riley et al. |
| 2005/0256942 A1 | 11/2005 | McCardle et al. |
| 2005/0278760 A1 | 12/2005 | Dewar et al. |
| 2005/0283534 A1 | 12/2005 | Bigagli et al. |
| 2005/0283782 A1* | 12/2005 | Lu et al. .................. 718/100 |
| 2006/0013143 A1 | 1/2006 | Garnett et al. |
| 2006/0097863 A1 | 5/2006 | Horowitz et al. |
| 2006/0200773 A1 | 9/2006 | Nocera et al. |
| 2006/0236368 A1 | 10/2006 | Raja et al. |
| 2006/0271552 A1 | 11/2006 | McChesney et al. |
| 2006/0271928 A1 | 11/2006 | Gao et al. |
| 2006/0294238 A1 | 12/2006 | Naik et al. |
| 2007/0204036 A1 | 8/2007 | Mohaban et al. |
| 2008/0168451 A1 | 7/2008 | Challenger et al. |
| 2008/0184248 A1 | 7/2008 | Barua et al. |
| 2008/0216082 A1* | 9/2008 | Eilam et al. .................. 718/104 |
| 2008/0288873 A1 | 11/2008 | McCardle et al. |
| 2009/0216881 A1 | 8/2009 | Lovy et al. |

(56) References Cited

U.S. PATENT DOCUMENTS

OTHER PUBLICATIONS

Brad Stone et al., UNIX Fault Management: A Guide for System Administration, Dec. 1, 1999, ISBN 0-13-026525-X, http://www.informit.com/content/images/013026525X/samplechapter/013026525.pdf.

IBM Tivoli Workload Scheduler job Scheduling Console User's Guide Feature Level 1.2 (Maintenance Release Oct. 2003), Oct. 2003, IBM Corporation, http://publib.boulder.ibm.com/tividd/td/TWS/SH19-4552-01/en_US/PDF/jsc_user.pdf.

Chen et al., "A flexible service model for advance reservation", Computer Networks, Elsevier science publishers, vol. 37, No. 3-4, pp. 251-262, Nov. 5, 2001.

Roy, Alain, "Advance Reservation API", University of Wisconsin-Madison, GFD-E.5, Scheduling Working Group, May 23, 2002.

Supercluster Research and Development Group "Maui Administrator's Guide", Internet citation, 2002.

Snell, et al., "The Performance Impact of Advance Reservation Metascheduling", pp. 137-153, Springer-Verlag Berlin Heidelberg, 2000.

Chase et al., "Dynamic Virtual Clusters in a Grid Site Manager", Proceedings of the 12$^{th}$ IEEE International Symposium on High Performance Distributed Computing (HPDC'03), 2003.

Chuang Liu et al. "Design and Evaluation of a Resource Selection Framework for Grid Applications" High Performance Distributed Computing, 2002. HPDC-11 2002. Proceedings S. 11$^{th}$ IEEE International Symposium on Jul. 23-26, 2002, Piscataway, NJ, USA IEEE, Jul. 23, 2002, pp. 63-72, XP010601162 ISBN: 978-0-7695-1686-8.

Lars C. Wolf et al. "Concepts for Resource Reservation in Advance" Multimedia Tools and Applications, [Online] 1997, pp. 255-278, XP009102070 The Netherlands Retreived from the Internet: URL: http://www.springerlink.com/content/h25481221mu22451/fulltext.pdf [retrieved on Jun. 23, 2008].

Si et al., "Language Modeling Framework for Resource Selection and Results Merging", SIKM 2002, Proceedings of the eleventh international conference on Information and Knowledge Management.

Luo et al. "A Language Modeling Framework for Resource Selection and Results Merging", Conference on Information and Knowledge Mangement, 2002 ACM, pp. 391-397.

\* cited by examiner

SYSTEM AND METHOD FOR PROVIDING DYNAMIC ROLL-BACK

PRIORITY APPLICATION

The present application is a continuation of U.S. patent application Ser. No. 11/208,138, filed Aug. 19, 2005, which is a continuation-in-part of PCT Application PCT/US 05/21427, filed on Jun. 17, 2005, the contents of which are incorporated herein by reference in their entirety.

BACKGROUND

1. Technical Field

The present disclosure relates to reservations in a cluster or more specifically to a system and method of providing dynamic roll-back reservations for compute resources.

2. Introduction

The present disclosure relates to a system and method of allocation resources in the context of a grid or cluster of computers. Grid computing can be defined as coordinated resource sharing and problem solving in dynamic, multi-institutional collaborations. Many computing projects require much more computational power and resources than a single computer or single processor can provide. Networked computers with peripheral resources such as printers, scanners, I/O devices, storage disks, scientific devices and instruments, etc., can need to be coordinated and utilized to complete a task or a job.

Grid/cluster resource management generally describes the process of identifying requirements, matching resources to applications, allocating those resources, and scheduling and monitoring compute resources over time in order to run applications and workload as efficiently as possible. Each project will utilize a different set of resources and thus is typically unique. In addition to the challenge of allocating resources for a particular job, administrators also have difficulty obtaining a clear understanding of the resources available, the current status of the compute environment and real-time competing needs of various users. One aspect of this process is the ability to reserve resources for a job. A workload manager will seek to reserve a set of resources to enable the compute environment to process a job at a promised quality of service. One example of workload management software is the various compute environment management software available from Cluster Resources, Inc., such as the Moab™ Workload Manager, Moab™ Cluster Manager, the Moab™ Grid Suite and the Moab™ Cluster Suite.

General background information on clusters and grids can be found in several publications. See, e.g., *Grid Resource Management, State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Massachusetts Institute of Technology, 2003.

It is generally understood herein that the terms grid and cluster are interchangeable in that there is no specific definition of either. In general, a grid will include one or more clusters as will be shown in FIG. 1A. Several general challenges exist when attempting to maximize resources in a grid. First, there are typically multiple layers of grid and cluster schedulers. A grid 100 generally includes a group of clusters or a group of networked computers. The definition of a grid is very flexible and can mean a number of different configurations of computers. The definition can depend on how a compute environment is administered and controlled via local control (clusters) or global control/administration (grids). The introduction here is meant to be general given the variety of configurations that are possible.

Figure 1A:
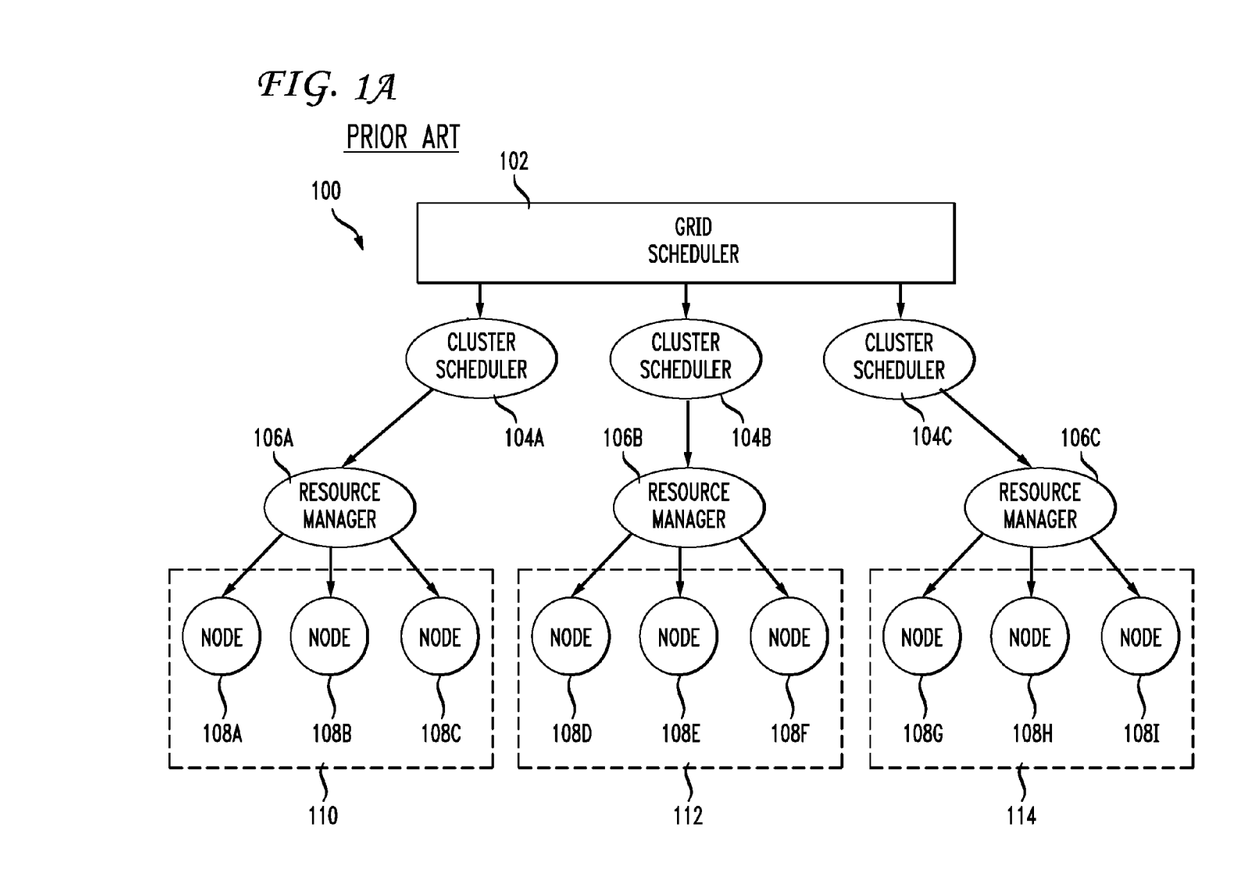
FIG. 1A illustrates generally a grid scheduler, cluster scheduler, and resource managers interacting with compute nodes.

A grid scheduler 102 communicates with one or more cluster schedulers 104A, 104B and 104C. Each of these cluster schedulers communicates with a respective resource manager 106A, 106B or 106C. Each resource manager communicates with a respective series of compute resources shown as nodes 108A, 108B, 108C in cluster 110, nodes 108D, 108E, 108F in cluster 112 and nodes 108G, 108H, 108I in cluster 114.

Local schedulers (which can refer to either the cluster schedulers 104 or the resource managers 106) are closer to the specific resources 108 and do not allow grid schedulers 102 direct access to the resources. Examples of compute resources include data storage devices such as hard drives and computer processors. The grid level scheduler 102 typically does not own or control the actual resources. Therefore, jobs are submitted from the high level grid-scheduler 102 to a local set of resources with no more permissions that then user would have. This reduces efficiencies and can render the reservation process more difficult. When jobs are submitted from a grid level scheduler 102, there is access information about the person, group or entity submitting the job. For example, the identity of the person who submitted the job can have associated with it a group of restrictions but also guarantees of service, such as a guarantee that 64 processors will be available within 1 hour of a job submission.

The heterogeneous nature of the shared resources also causes a reduction in efficiency. Without dedicated access to a resource, the grid level scheduler 102 is challenged with the high degree of variance and unpredictability in the capacity of the resources available for use. Most resources are shared among users and projects and each project varies from the other. The performance goals for projects differ. Grid resources are used to improve performance of an application but the resource owners and users have different performance goals: from optimizing the performance for a single application to getting the best system throughput or minimizing response time. Local policies can also play a role in performance.

Within a given cluster, there is only a concept of resource management in space. An administrator can partition a cluster and identify a set of resources to be dedicated to a particular purpose and another set of resources can be dedicated to another purpose. In this regard, the resources are reserved in advance to processing the job. By being constrained in space, the nodes 108A, 108B, 108C, if they need maintenance or for administrators to perform work or provisioning on the nodes, have to be taken out of the system, fragmented permanently or partitioned permanently for special purposes or policies. If the administrator wants to dedicate them to particular users, organizations or groups, the prior art method of resource management in space causes too much management overhead requiring a constant adjustment to the configuration of the cluster environment and also losses in efficiency with the fragmentation associated with meeting particular policies.

Figure 1B:
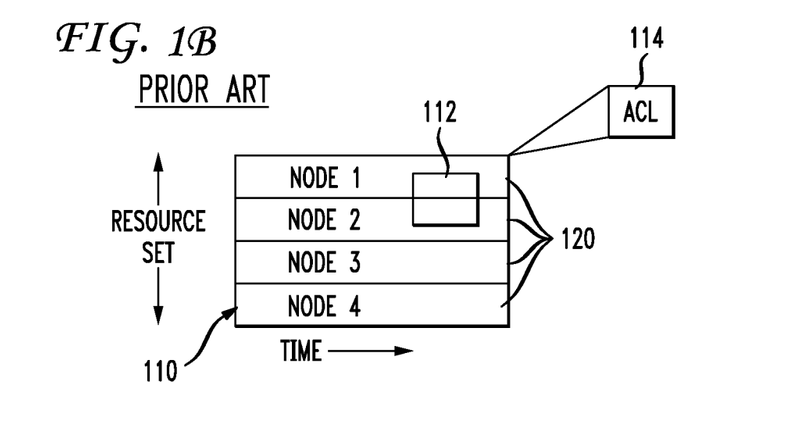
FIG. 1B illustrates a job submitted to a resource set in a computing environment.

Reservations of compute resources were introduced above. To manage the jobs submissions, a cluster scheduler will employ reservations to insure that jobs will have the resources necessary for processing. FIG. 1B illustrates a cluster/node diagram for a cluster 124 with nodes 120. Time is along the X axis. An access control list (ACL) 114 to the cluster is static, meaning that the ACL is based on the credentials of the person, group, account, class or quality of service making the request or job submission to the cluster. The ACL 114 determines what jobs get assigned to the cluster 110 via a reservation 112 shown as spanning into two nodes of the cluster.

Either the job can be allocated to the cluster or it can't, and the decision is determined based on who submits the job at submission time. Further, in environments where there are multiple clusters associated with a grid, and workload is transferred around the grid, there is a continual difficulty of managing restrictions and guarantees associated with each entity that can submit jobs. Each cluster will have constant alterations made to users and groups as well as modifications of the respective compute environment. Currently, there is no mechanism to insure that up-to-date identity information for a particular user where workload submitted by that user can be transferred to an on-demand site or to a remote cluster from the submitter's local environment.

One deficiency with the prior approach is that there are situations in which organizations would like to make resources available but only in such a way as to balance or meet certain performance goals. Particularly, groups can establish a constant expansion factor and make that available to all users or they can make a certain subset of users that are key people in an organization and give them special services when their response time drops below a certain threshold. Given the prior art model, companies are unable to have the flexibility over their cluster resources.

To improve the management of cluster resources, what is needed in the art is an improved method for a scheduler, a cluster scheduler or cluster/grid workload management system to manage resources. Further what is needed is an improved method of managing reservations such that the user of the compute environment is more efficient while maintaining policies and agreed qualities of service.

SUMMARY

Additional features and advantages of the disclosure will be set forth in the description which follows, and in part will be obvious from the description, or can be learned by practice of the disclosure. The features and advantages of the disclosure can be realized and obtained by means of the instruments and combinations particularly pointed out in the appended claims. These and other features of the present disclosure will become more fully apparent from the following description and appended claims, or can be learned by the practice of the disclosure as set forth herein.

The present disclosure addresses deficiencies in the prior art by improving upon the use of reservations that enforce service level agreements. A roll-back reservation was introduced in the parent case PCT Application PCT/US 05/21427, filed on Jun. 17, 2005. A dynamic aspect of the roll-back reservation was also introduced in that case. This application presents further details regarding the function and operation of the dynamic roll-back reservation of compute resources. The roll-back reservation according to the present disclosure can be dynamically modified either in time or in space for the purpose of increasing the efficiency of the use of the compute environment.

The disclosure relates to systems, methods and computer-readable media for providing a dynamic roll-back reservation mask in a compute environment. The method of managing compute resources within a compute environment includes, based on an agreement between a compute resource provider and a customer, creating a roll-back reservation mask for compute resources which slides ahead of current time by a period of time. Within the roll-back reservation mask, the method specifies a subset of consumers and compute resource requests which can access compute resources associated with the roll-back reservation mask and, based on received data, the method dynamically modifies at least one of (1) the period of time the roll-back reservation mask slides ahead of current time and (2) the compute resources associated with the roll-back reservation mask.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

The present disclosure relates to resource reservations in the context of a cluster or grid environment or any other grouping of compute devices or compute nodes that can have similar administrative mechanisms to cluster and grid computing. The cluster can be operated by a hosting facility, hosting center, a virtual hosting center, data center, grid, cluster, on-demand computer center and/or utility-based computing environments. As introduced above, the disclosure will provide details for how a roll-back reservation can be dynamically modified either in time or space or both for the purpose of using received data about the compute environment, the job, the requestor, or any other type of data that can affect the compute environment to be utilized to dynamically modify the roll-back reservation to improve efficiency.

The system embodiment of the disclosure can include a computing device that is operating a module or software package, such as Cluster Resources' Moab™ software, to perform the steps and functions described herein. The computing device can include the known hardware components such as a processor, memory such as RAM and/or ROM, a bus linking the various components, disk storage of any type, communication devices such as modems or network cards to enable communication with other computing devices in a cluster or a grid, and so forth. The particular hardware components combining to make a computing device are not necessarily limited to any specific set but can include any known or future-developed configuration of hardware. Not each computing device in a cluster can have a display and a means for user input such as a keyboard and mouse. It is contemplated, however, that the system would include a graphical user interface to allow users and administrators to submit workload and manage the compute environment. The system aspect of the disclosure can include multiple computing devices. In fact, the system can include the cluster or grid itself inasmuch as the multiple nodes including a cluster or grid can be required to operate a software module or components of a workload management module in order to practice the principles of the disclosure.

It is also contemplated that the system can include features such as multi-modal interfaces for ease of interaction and control of the compute environment. For example, the graphical user interface can utilize natural language dialog, touchscreen input, motion detection input, gesture input, mouse input or a combination of these types of input to enable improved efficiency for users and administrators of the compute environment.

As part of the system embodiment of the disclosure, a computer program can include various modules written in a computer programming language, such as the C programming language or any suitable language. The modules would perform specific functions as stated in the method embodiment of the disclosure. The modules can operate on a single or multiple computing devices. As such, each module can be configured to perform the particularly recited function discussed herein.

The present disclosure allows the ACL (access control list) for a reservation to have a dynamic aspect instead of simply being based on who the requester is. The ACL decision making process is based at least in part on the current level of service or response time that is being delivered to the requester. To illustrate the operation of the ACL, assume that a user submits a job and that the ACL reports that the only job that can access these resources are those that have a queue time that currently exceeds two hours. If the job has sat in the queue for two hours it will then access the additional resources to prevent the queue time for the user from increasing significantly beyond this time frame. The decision to allocate these additional resources can be keyed off of utilization of an expansion factor and other performance metrics of the job.

Whether or not an ACL is satisfied is typically determined by the scheduler 104A. However, there is no restriction in the principle of the disclosure regarding where or on what node in the network the process of making these allocation of resource decisions occurs. The scheduler 104A is able to monitor all aspects of the request by looking at the current job inside the queue and how long it has sat there and what the response time target is and the scheduler itself determines whether all requirements of the ACL are satisfied. If requirements are satisfied, it releases the resources that are available to the job. A job that is located in the queue and the scheduler communicating with the scheduler 104A. If resources are allocated, the job is taken from the queue and inserted into the reservation in the cluster or compute environment.

An example benefit of this model is that it makes it significantly easier for a site to balance or provide guaranteed levels of service or constant levels of service for key players or the general populace. By setting aside certain resources and only making them available to the jobs which threaten to violate their quality of service targets it increases the probability of satisfying it.

The disclosure now continues to discuss reservations further. An advance reservation is the mechanism by which the present disclosure guarantees the availability of a set of resources at a particular time. With an advanced reservation a site now has an ability to actually specify how the scheduler should manage resources in both space and time. Every reservation consists of three major components: a list of resources, a timeframe (a start and an end time during which it is active), and the ACL. These elements are subject to a set of rules. The ACL acts as a doorway determining who or what can actually utilize the resources of the compute environment such as a cluster. It is the job of the cluster scheduler to make certain that the ACL is not violated during the reservation's lifetime (i.e., its timeframe) on the resources listed. The ACL governs access by the various users to the resources. The ACL does this by determining which of the jobs, various groups, accounts, jobs with special service levels, jobs with requests for specific resource types or attributes and many different aspects of requests can actually come in and utilize the resources. With the ability to say that these resources are reserved, the scheduler can then enforce true guarantees and can enforce policies and enable dynamic administrative tasks to occur. The system greatly increases in efficiency because there is no need to partition the resources as was previously necessary and the administrative overhead is reduced in terms of staff time because things can be automated and scheduled ahead of time and reserved.

As an example of a reservation, a reservation can specify that node002 is reserved for user John Doe on Friday. The scheduler will thus be constrained to make certain that only John Doe's jobs can use node002 at any time on Friday. Advance reservation technology enables many features including backfill, deadline based scheduling, QOS support, and meta scheduling.

There are several reservation concepts that will be introduced as aspects of the disclosure. These include dynamic reservations, co-allocating reservation resources of different types, reservations that self-optimize in time, reservations that self-optimization in space, reservations rollbacks and reservation masks. The main focus of the present disclosure is the roll-back reservation mask and how it can be dynamically modified.

Dynamic reservations are reservations that are able to be modified once they are created. Attributes of a reservation can change based on a feedback mechanism that adds intelligence as to ideal characteristics of the reservation and how it should be applied as the context of its environment or an entities needs change. One example of a dynamic reservation is a reservation that provides for a guarantee of resources for a project unless that project is not using the resources it has been given. A job associated with a reservation begins in a cluster environment. At a given portion of time into processing the job on compute resources, the system receives compute resource usage feedback relative to the job. For example, a dynamic reservation policy can apply which says that if the project does not use more than 25% of what it is guaranteed by the time that 50% of its time has expired, then, based on the feedback, the system dynamically modifies the reservation of resources to more closely match the job. In other words, the reservation dynamically adjusts itself to reserve X % fewer resources for this project, thus freeing up unused resource for others to use.

Another dynamic reservation can perform the following step: if usage of resources provided by a reservation is above 90% with fewer than 10 minutes left in the reservation then the reservation will attempt to add 10% more time to the end of the reservation to help ensure the project is able to complete. In summary, it is the ability for a reservation to receive manual or automatic feedback to an existing reservation in order to have it more accurately match any given needs, whether the needs are associated with the submitting entity, the community of users, administrators, etc. The dynamic reservation improves the state of the art by allowing the ACL to the reservation to have a dynamic aspect instead of simply being based on who the requestor is. The reservation can be based on a current level of service or response time being delivered to the requestor.

As another example of a dynamic reservation, consider a user who submits a job wherein the reservation needs an ACL that requires that the only job that can access a set of resources is a job with a queue time currently exceeding two hours. If the job has sat in the queue for two hours it will then access the additional resources to prevent the queue time for the user from increasing significantly beyond this time frame. An administrator can also key the dynamic reservation off of utilization, off of an expansion factor and other performance metrics of the job.

The ACL and scheduler are able to monitor all aspects of the request by looking at the current job inside the queue and how long it has sat there and what the response time target is. It is preferable, although not required, that the scheduler itself determine whether all requirements of the ACL are satisfied. If the requirements are satisfied, the scheduler releases the resources that are available to the job.

The benefits of this model is it makes it significantly easier for a site to balance or provide guaranteed levels of service or constant levels of service for key players or the general populace. By setting aside certain resources and only making them available to the jobs which threaten to violate their quality of service targets it increases the probability of satisfying it.

Another reservation type is a self optimizing reservation in time. In many cases, people will request resources and request that they be available at a particular time. For example, a person is doing a demonstration and it happens to be from 2:00 pm to 4:00 pm. In many other cases, people will simply have a deadline or simply want processing as early as possible. With a self-optimizing in time reservation, the scheduler is actually able to lock in a set of resources for a particular request and then over time evaluate the cluster resources and determine if it can actually improve on it and improve on the reservation in such a way as to guarantee that it does not lose the resources that it has already made available.

With self-optimizing reservations in time, a particular request can come in request resources that meet the following criteria but the requester prefers resources that meet a more increasingly strict criteria. The scheduler, in establishing the reservation, can satisfy the required criteria but not necessarily satisfy all the preferred criteria. Over time, the scheduler, once it has established a reservation that meets the minimum criteria, can continue to look at newly freed up resources and determine if it can, to a larger, satisfy the preferred resource needs as well. This self optimizing reservation technology is also useful to work around resource failures in the case of a reservation that has already had reserved all the resources it needs and it has a node failure. It can actually continue to locate resources and reallocate resources that are still up and running and be able to satisfy the time frame it originally promised by excluding the failed node and picking up a newly available compute node.

Figure 2A:
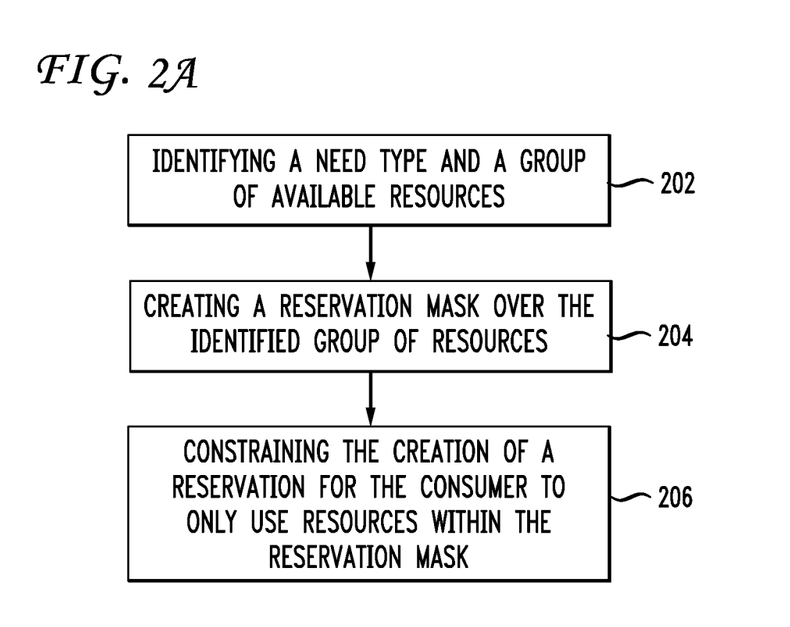
FIG. 2A illustrates a method of creating a reservation mask.

With the above concepts about reservations in mind, the reservation mask is next introduced. FIG. 2A illustrates the steps taken to provide a reservation mask for compute resources. The method includes identifying a need type and a group of available resources (202), creating a reservation mask over the identified group of resources (204) and if a request from a consumer matches the need type, then constraining the creation of a reservation for the consumer to only use resources within the reservation mask (206). The reservation mask therefore has a different purpose from the reservation itself. The mask is a policy-enforcing mechanism to manage and constrain reservations. Identifying a need type and a group of available resources can be based on an administrative policy or some other criteria.

If a request from the consumer does not match the need type, then no constraints are enforced for creating a reservation for the request from the consumer. Creating the reservation mask can also involve specifying at least one timeframe during which the reservation mask enforces constraints, such as during business hours, eastern time. The time frame can also be one or more independent or periodic time frames. The method can also provide for specifying an access control list that constrains which consumers or resource requests can utilize resources within the reservation mask. The need type can refer to a particular use, a user, a group of users, a job source, a type of job submission, personal reservation, grid reservation, cluster reservation and so forth.

A personal reservation, for example, can consist of a reservation that dedicates resource access to a specific user or group of users. If the personal reservation provides access to resources to a group of users, then each reservation and reservation timeframe are determined by a user in the group of users that requests the respective reservation. A grid reservation is a reservation requested from outside an administrative group.

Figure 2B:
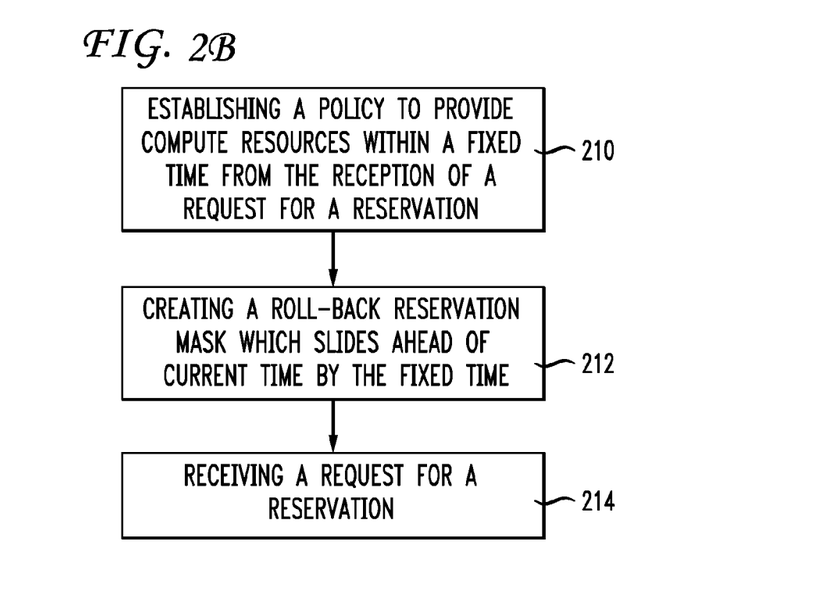
FIG. 2B illustrates a method of providing a roll-back reservation mask.

Another aspect of reservation relates to a roll-back reservation in time or a roll-back reservation mask. FIG. 2B illustrates this method embodiment of the present disclosure. The method of managing compute resources within a compute environment includes establishing a policy to provide compute resources within a fixed time from the reception of a request for a reservation (210), creating a roll-back reservation mask which slides ahead of current time by the fixed time (212) and receiving a request for a reservation (214). Upon receiving the request for a reservation, the roll-back reservation mask insures that compute resources will be available for reservation within the fixed time according to the policy. The policy can be established according to an agreement with a requestor of compute resources and the provider or manager of the compute resources. An example policy would insure that the requestor of resources would be able to reserve and have at a predetermined quality of service, 100 nodes, 3 GB of memory and a certain bandwidth of communication within six hours of a request.

Within the roll-back reservation mask, the mask analyzes compute resources according to the policy to insure that compute resources can be reserved by the requestor within the fixed period of time. An example of the request for a reservation is a consumption request, where a user desires to process a submitted job using the compute resources. After receiving the reservation request, the roll-back reservation mask reserves the appropriate compute resources according to the request and the policy such that within the fixed amount of time, the requestor can have a reservation established and have access to his or her reserved resources.

The roll-back reservation mask can also be self-optimizing. Given that there is sufficient time to analyze the request or reservation and the compute resources, the reservation mask can analyze whether a level of service can be improved for the reservation request and if the level of service can be improved, then the mask cancels the reservation of compute resources and reserves a second group of compute resources.

The mask or some other compute process can perform some of these steps. This self-optimization process of modifying or canceling and re-issuing reservations to improve performance of either the compute environment or the quality of service delivered to the requestor can occur until a predetermined point. For example, assume the policy requires that the requestor have resources reserved and available for use within one hour of the request. If the requestor requests a reservation for three hours into the future, the roll-back reservation mask has two hours until the fixed guaranteed time to optimize the request. When the time comes where the request needs to be honored within one hour, one aspect of the disclosure requires the reservation to be set and thus not "covered" by the reservation mask. The reservation in this sense has slipped out from underneath the reservation mask. This is shown by the reservations 406 in FIG. 4 and FIG. 5.

Figure 4:
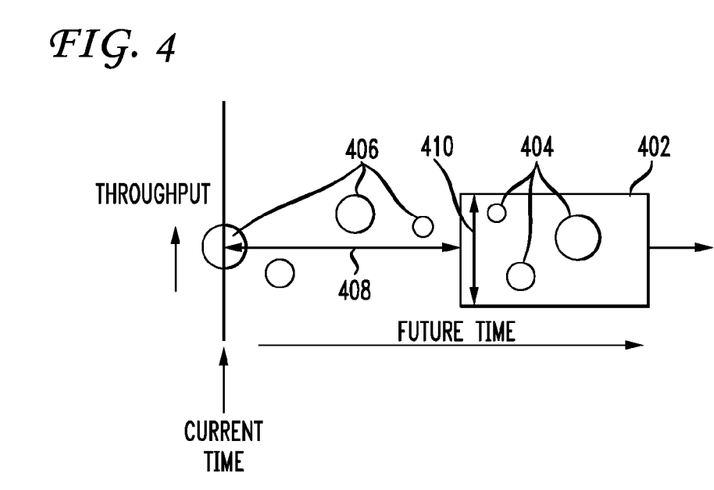
FIG. 4 illustrates a dynamic roll-back reservation mask.
Figure 5:
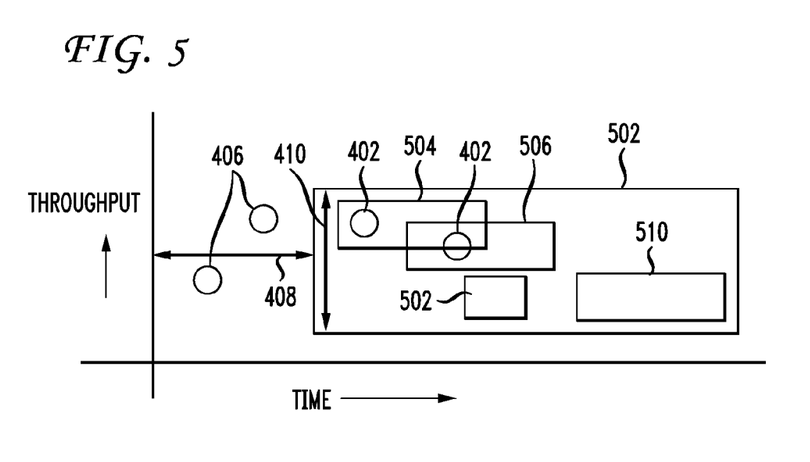
FIG. 5 illustrates another aspect of a dynamic roll-back reservation mask.

The roll-back reservation mask 402, 502 has a length preferably based on the agreement. This can be, for example, a several months or it can be indefinite or of infinite length. Preferably, the length of the mask 402, 502 is associated with how far into the future it analyzes compute resources and a height associated with a guaranteed throughput.

Figure 2C:
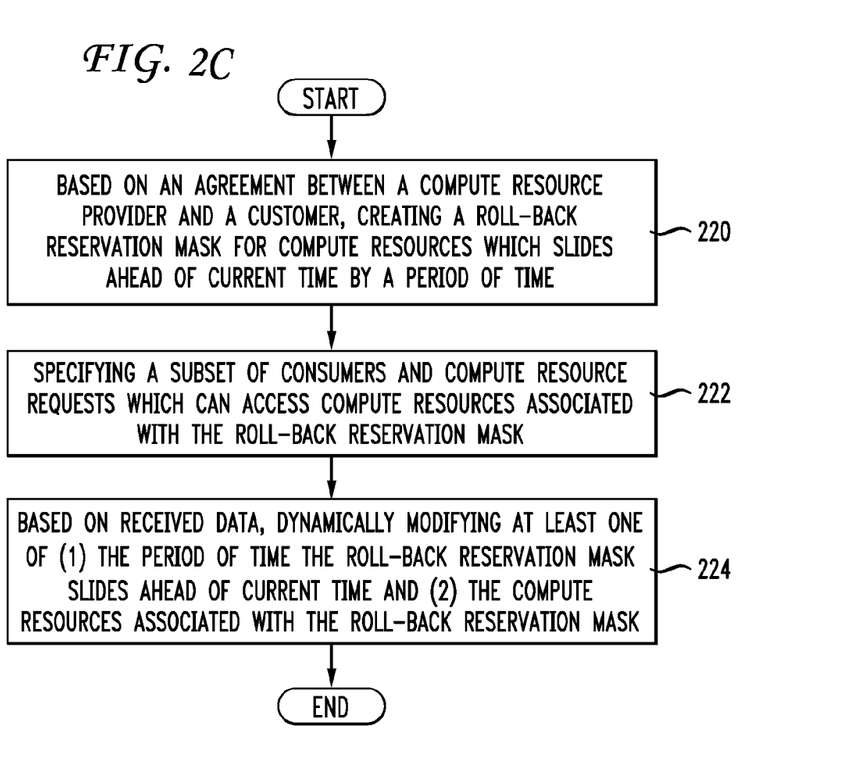
FIG. 2C illustrates a method of creating a dynamic roll-back reservation mask.

FIG. 2C illustrates the primary embodiment of the disclosure. This embodiment relates to the method of providing a dynamic roll-back reservation mask in a compute environment. The method of managing compute resources within a compute environment includes, based on an agreement between a compute resource provider and a customer, creating a roll-back reservation mask for compute resources which slides ahead of current time by a period of time (220). Within the roll-back reservation mask, the method specifies a subset of consumers and compute resource requests which can access compute resources associated with the roll-back reservation mask (222) and, based on received data, the method dynamically modifies at least one of (1) the period of time the roll-back reservation mask slides ahead of current time and (2) the compute resources associated with the roll-back reservation mask (224). After some discussion of standing reservations and "sandboxes", the application will address further details about the dynamic roll-back reservation.

Figure 3A:
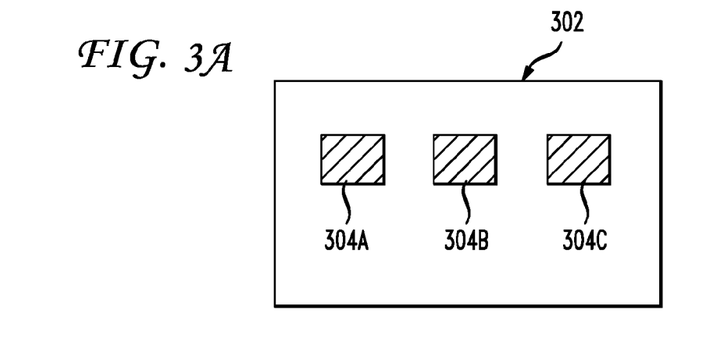
FIG. 3A illustrates a reservation mask.

FIG. 3A illustrates a standing reservation. In cluster 302, there are standing reservations shown as 304A, 304B and 304C. These reservations show resources allocated and reserved on a periodic basis. These are consuming reservations meaning that cluster resources will be consumed by the reservation.

A reservation mask, mentioned above, allows a compute site to create "sandboxes" in which other guarantees can be made. The most common aspects of this reservation are for grid environments and personal reservation environments. In a grid environment, a remote entity will be requesting resources and will want to use these resources on an autonomous cluster for the autonomous cluster to participate. In many cases it will want to constrain when and where the entities can reserve or utilize resources. One way of doing that is via the reservation mask.

Figure 3B:
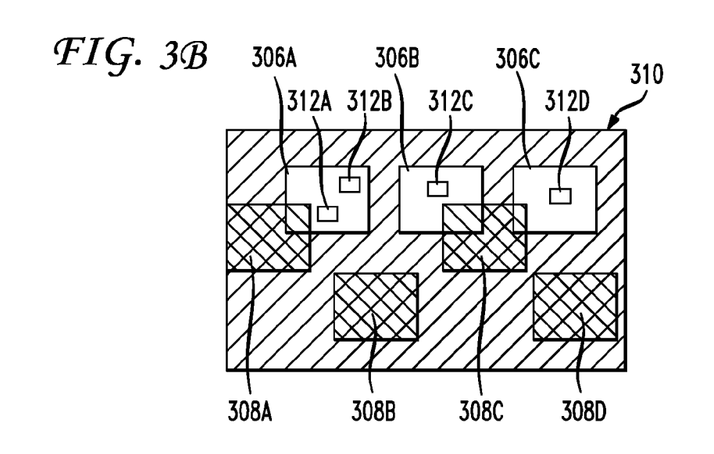
FIG. 3B illustrates another aspect of the reservation mask.

FIG. 3B illustrates the reservation mask shown as creating sandboxes 306A, 306B, 306C in cluster 310 and allows the autonomous cluster to state that only a specific subset of resources can be used by these remote requesters during a specific subset of times. When a requester asks for resources, the scheduler will only report and return resources available within this reservation, after which point the remote entity desires it, he can actually make a consumption reservation and that reservation is guaranteed to be within the reservation mask space. The consumption reservations 312A, 312B, 312C, 312D are shown within the reservation masks.

In cluster 310 the reservation masks operate differently from consuming reservations in that they are enabled to allow personal reservations to be created within the space that is reserved. ACL's are independent inside of a sandbox reservation or a reservation mask in that you can also exclude other requesters out of those spaces so they're dedicated for these particular users.

The benefits of this approach include preventing local job starvation, and providing a high level of control to the cluster manager in that he or she can determine exactly when, where, how much and who can use these resources even though he doesn't necessarily know who the requesters are or the combination or quantity of resources they will request. The administrator can determine when, how and where requestors will participate in these grids. A valuable use is in the space of personal reservations which typically involves a local user given the authority to reserve a block of resources for a rigid time frame. Again, with a personal reservation mask, the requests are limited to only allow resource reservation within the mask time frame and mask resource set, providing again the administrator the ability to constrain exactly when and exactly where and exactly how much of resources individual users can reserve for a rigid time frame. The individual user is not known ahead of time but it is known to the system, it is a standard local cluster user.

The reservation masks 306A, 306B and 306C define periodic, personal reservation masks where other reservations in a cluster 310 can be created, i.e., outside the defined boxes. These are provisioning or policy-based reservations in contrast to consuming reservations. In this regard, the resources in this type of reservation are not specifically allocated but the time and space defined by the reservation mask cannot be reserved for other jobs. Reservation masks enable the system to be able to control the fact that resources are available for specific purposes, during specific time frames. The time frames can be either single time frames or repeating time frames to dedicate the resources to meet project needs, policies, guarantees of service, administrative needs, demonstration needs, etc. This type of reservation insures that reservations are managed and scheduled in time as well as space. Boxes 308A, 308B, 308C and 308D represent non-personal reservation masks. They have the freedom to be placed anywhere in cluster including overlapping some or all of the reservation masks 306A, 306B, 306C. Overlapping is allowed when the personal reservation mask was setup with a global ACL. A global ACL is an ACL that anyone can use. It is wide open in the sense that anyone can take advantage of the resources within that space. To prevent the possibility of an overlap of a reservation mask by a non-personal reservation, the administrator can set an ACL to constrain it is so that only personal consumption reservations are inside. These personal consumption reservations are shown as boxes 312B, 312A, 312C, 312D which are constrained to be within the personal reservation masks 306A, 306B, 306C. The 308A, 308B, 308C and 308D reservations, if allowed, can go anywhere within the cluster 310 including overlapping the other personal reservation masks. The result is the creation of a "sandbox" where only personal reservations can go without in any way constraining the behavior of the scheduler to schedule other requests.

Returning to the discussion of the dynamic roll-back reservation mask, another view of the dynamic roll-back reservation mask 402 is shown in FIG. 4. This reservation mask 402 has particular application for enforcing policies or allowing support for service level guarantees in service level agreements. A level of service guarantee allows a site, cluster or grid to guarantee that a particular consumer or organization or type of credential is guaranteed a certain quantity of resources within a certain amount of time 408. The standard way to provide those guarantees would be to dedicate a block of resources that satisfy the needs and would be statically and rigidly partitioned so that no one else could access it. The request of that organization could not extend beyond the bounds of the dedicated block.

A self optimizing reservation will only slide forward barring resource failure of the actual compute resources. It does this by, when it makes a query to determine what resources are available, as part of an algorithm, the reservation determines that it has availability to both free resources and the resources it already has reserved. In such a case it then performs an analysis and looks at resources that were recently freed by other workload and other reservations that completed early (which is actually quite common in a cluster environment) and if it can find that it can improve the level of service delivered to the request or it will actually create the new reservation and will remove the old reservation and make other adjustments as needed. A self optimizing reservation therefore has the ability to improve any given attribute of service to the submitting entity, community of users, administrators, etc.

With the present disclosure regarding the dynamic reservation roll-back, an administrator can create a reservation mask 402 which enforces its policy and continues to float in time a certain distance 408 ahead of the current time. Typically, the rectangular area of the reservation has a height that corresponds to guaranteed throughput (or relates to any computing environment parameter such as a number of nodes, storage that is associated with the mask, bandwidth, etc.) when processing jobs and the horizontal distance that corresponds to the length in time of the reservation. The reservation mask 402 can correspond to a certain amount of time according to a service level agreement, such as 3 or 4 months for example. The reservation mask 402 can extend into infinity as well if there is no defined ending time. The reservation mask 402 is a provisioning reservation and maintains the time offset 408 to the current time.

To illustrate the roll-back reservation, consider a service level agreement with a company to have twenty resources available within one hour of the request for the resources and that they can make the request anytime. The time offset 408 can then be set to one hour and the company will never wait more than one hour to reserve and use up to twenty resources. The reservation mask 402 monitors the resources and when a request is made for resources, consumption reservations 404 are allocated and left behind 406 as the roll-back reservation mask maintains its offset. Those that are left behind are not "covered" by the reservation 402 any longer.

An implementation with reservation rollback would allow a site to set up basically a floating reservation mask that extends from one hour in the future until a time further in the future, such as 4 or 8 hours in the future, and continues to slide forward in time. The reservation mask 402 will only allow jobs from this organization can drop down requests or reserve host resources underneath the reservation mask. As time moves forward, the reservation mask slides forward in time so it always maintains a constant distance in the future allowing these guarantees 404 to be created and maintained 406 on the cluster.

The time offset 408 can be static or dynamic. A static offset 408 will maintain a constant offset time, such as one hour into the future. The static offset will likely be set by a service level agreement wherein a company requests that the resources become available within an hour. The offset 408 can also by dynamic. There can be requests in the service level agreement where under a given event or set of events, the offset would change wherein the reservation slides closer or farther away from the current time to provide a guarantee of resources within ½ (instead of 1 hour) or 2 hours in the future. There are a variety of ways to vary the offset. One can be to simply cancel the current sliding reservation and create a new reservation at a different offset. Another way would be to maintain the current reservation but slide it closer or farther away from the current time. The factors that adjust the dynamic nature of the offset can be based on company requests, the nature and use of the cluster resources, the time the request is made, historical information, statistical information (e.g., 90% of the time workload from user number 12 finishes at least 15 minutes late) and so forth. For example, if the request for resources is made at midnight on a Friday night, perhaps instead of the 1 hour availability of resources, the hosting center analyzes the cluster resources and the time of the request and determines that it can deliver the resources in ½ hour. The company can have a flexible offset where, if the request is made during a block of time such as between 3-4:30 pm (near the end of the work day), the offset can be shortened so that the job can be processed sooner. The modifications to the offset can be automatic based on a feedback loop of information or can be adjustable by an administrator.

The dynamic aspect of the period of time in which the reservation mask slides ahead of the current time is discussed next. This aspect of the disclosure provides some flexibility in how soon resources need to be available after a request for a reservation. For example, if the fixed time offset 408 is three hours and a user submits a request for a reservation on Friday at 3:00 pm, the soonest the resources would be guaranteed to be available to process a submitted job is 6:00 pm. That can be beyond the time that the user desires to wait to submit a job. A dynamically modifiable period of time allows for some parameters that can move up the period of time in which the resources can be available. FIG. 2C provides the basic steps of providing a dynamic roll-back reservation.

The policy can be based on an agreement with a submitter of requests for reservations or a service level agreement. The period of time 408 and/or the resources associated with the reservation mask 410 can be dynamically modifiable based on a number of factors, such as parameters within the policy, events related to the compute environment (a cluster environment or a grid environment), historical information such as previous jobs submitted by the submitter, events related to a time associated with a job submission or the job submission itself, a request by a consumer (for example, for resources within one hour where the set time off-set 408 is currently three hours), factors such as arrival of new consumers to the compute environment, new resources added to the environment or made available for use by the environment such as access to an on-demand computing center, node failures, system maintenance actions, backlog thresholds being hit, administrative action, failures to connect to peer-to-peer services such as where the compute environment can no longer overflow to another on-demand site, reported statistics related to the compute environment, a desire to increase protection to guarantee SLA terms locally and/or events related billing. Access to the compute environment is allowed for authorized users. As can be seen, there can be a number of factors that can play a role in an analysis of whether the period of time from which resources must be available after a request is received can be modified (increased or decreased).

Examples of a peer-to-peer environment include a group of clusters, each cluster in the group running workload manager/cluster scheduler software such as Cluster Resource's MOAB™. The workload managers on each cluster can communicate data with the other workload managers about its system utilization and availability for overflow workload. These workload managers can negotiate and optimize the overall global workload management by making available unused resources for other clusters to utilize. Thus, as a dynamic roll-back reservation mask is created, the time offset 408 and/or the resources 410, as well as other parameters, can be modified based on peer-to-peer information, resource availability through a peer-to-peer environment, and so forth.

Examples of the resources that can be dynamically modified 410 include, but are not limited to, processor nodes, bandwidth resources, licenses, memory, disk storage, and generic resources or policy slots. The workload manager software that manages the compute environment can reserve instances of a generic resource or instances of a service. For example, the reservation mask can be associated with a reservation of 100 instances of a particular service slot. The number in the reservation can be dynamically increased or decreased as set forth herein as an aspect of the disclosure. The point here is that a workload manager and/or a scheduler of a compute environment can refer to a particular resource or particular service available within the compute environment in a generic sense in that it considers the ability to simply reserve instances of the particular service. These generic references to resources or services can be dynamically modified as part of a reservation mask just as a physical resource such as 512 MB of hard disk space.

The following is an example of historical information that can trigger a dynamic modification of the time offset 408 and/or the resources 410 associated with a reservation mask. Assume that under a service level agreement (SLA), a consumer is promised a 95% success rate in achieving fulfillment of SLA promises, such as resources available for processing jobs within 2 hours of a request. Historical information can track whether the success rate has always been fulfilled. For example, if the consumer has a 100% success rate, wherein the SLA promises 95%, then at least one of the time offset 408 or the resource amount 410 can be adjusted to enable others users easier access to the resources because in so doing, the consumer can still "lose" some efficiency but still maintain the promised 95% success rate.

The time off-set 408 and resource amount 410 can be adjusted either way. If a consumer has been promised 95% success rate and historically only achieves 90%, then the time offset 408 and resource amount 410 can be dynamically adjusted to increase the success rate for that user. Another example can be that compute environment utilization is dropping off significantly. In this case, the system can achieve a high quality of service success rate even with backing off SLA guarantees established by the parameters 408 and 410. Therefore, these adjustments can modify the utilization and responsiveness for subsets of jobs within the compute environment.

Other features associated with the dynamic roll-back reservation mask are also contemplated. For example, the system can also receive data and dynamically modify, in addition to or as an alternate to the time offset 408, the resources 410 associated with the roll-back reservation mask.

The parameters 408 and 410 can also be dynamically modified according to a negotiation between one entity and another. For example, when a consumer submits a request or a job with a modification request associated with time 408 or resources 410, then the consumer essentially is requesting a negotiation with the workload manager (or module that governs the access, reservation, and consumption) of the compute environment or the compute resource provider. This can, as mentioned above, be a request for improved time, more resources for a certain cost, etc. As another example, the user can actually bid to pay more for a favorable parameter adjustment and the use of compute resources can be "auctioned" off by the provider. In this regard, the user offers to pay an additional amount for a dynamic modification.

If a user has a prepaid amount in an account that is debited as resources are consumed by the user, a policy can be set that relaxes the quality of service if the consumer consumes the prepaid amount in the account. Where the consumer is operating "in the red", the compute environment provider can drop the credentials or quality of service for that user until the account is paid up. There also can be a graduated scale where as the account gets further and further into the red, the quality of service continues to get worse and worse.

Another scenario is that a first hosting center can have a workload manager, such as Cluster Resource Inc.'s MOAB™ software, that negotiates with a second hosting center's workload manager for access to and use of compute resources. This is an example of a peer-to-peer negotiation. Most negotiations take resources, pricing, consumer credentials, group credentials, resource availability, historical information, and so forth into account in resolving conflicts and engaging in negotiations over whether to and by how much should the system dynamically modify these parameters.

Where a user negotiates with the provider over modifications of the parameters 408, 410, the negotiation is based on what the user is allowed to do. For example, the SLA or other policy will place limits on individual users, such as they are only allowed 50 nodes at a time, and so forth. Any negotiation will have these policies as limits on the scope of the negotiation and when, if at all, those policies can be violated. Where an administrator is requesting and negotiating over a modification, the negotiation is not likely as limited by policies and is more about what the system is capable of delivering in the modified environment. The peer-to-peer negotiation introduced above between one workload manager and another workload manager can also have policy constraints based on the individual compute environment, users and/or groups within the respective environments and so forth.

The dynamic modification of parameters 408 and 410 can also be related to at least one of a policy and a feedback loop. For example, the policy can be embedded in a SLA or can be associated with the compute environment. The policy can relate to actions to take based on how well the SLA is being fulfilled or how well non-SLA metrics are being fulfilled such as overall system utilization. The feedback loop aspect of the disclosure relates to each reservation mask having a purpose. How well the mask fulfils its purpose is fed back into the system to consider thresholds and whether dynamic modifications need to be made. For example, a hosting center can have a 95% success rate goal. If, over time, the hosting center can reduce the amount of resources reserved for users or groups, and still match its 95% goal, then the hosting center can dynamically adjust downward the services to one or more clients and still meet that client's SLA requirements while increasing resources to other users and groups while still maintaining its hosting center policy goal.

The reservation rollback policy mask is stackable, allowing multiple different types of service or service level agreements to be simultaneously satisfied and share a collection of resources. This feature is illustrated in FIG. 5. A reservation 502 is shown and can generally be considered as an aggregation of requests from various masks 504, 506, 508 510. These are aggregated into one space 502 which will then allow reservations to be created on a first come first serve basis, or based on other factors. If these reservation masks 504, 506, 508 and 510 are stacked with individual offsets from the current time (not shown), the administrator can allow the masks to be partitioned among consumers. A useful component of this stackable approach is the capability to have an enveloping reservation 502 created with a total quantity of resource and rollback time offset 408 and a duration to the end of the SLA. Once that reservation space is established or paid for, as a service, the hosting center sub-partitions the space using reservation to provide service guarantees, response time guarantees, quantity or resources guarantees taking advantage of the stacking capability.

A company can therefore establish the enveloping reservation 502 and request from the hosting center that they partition the space according to various organizations within the enveloping reservation 502. This eliminates the need for a large entity to have its own group of clusters of computer. The parameters associated with the time offset 408 and resources allocation 410 can be dynamically modifiable in this example as well based on the factors discussed above. In this case, additional factors can be considered when dynamically modifying these parameters that relate to the stacked service or service level agreements that share the collection of resources.

Embodiments within the scope of the present disclosure can also include computer-readable media for carrying or having computer-executable instructions or data structures stored thereon. Such computer-readable media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure can be practiced in network computing environments with many types of computer system configurations, including personal computers, hand-held devices, multi-processor systems, microprocessor-based or programmable consumer electronics, network PCs, mini-computers, mainframe computers, and the like. Embodiments can also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

Although the above description may contain specific details, they should not be construed as limiting the claims in any way. For example, other parameters besides the time-off set 408 and resources 410 in the reservation mask can also be modified dynamically. For example, whether the reservation mask extends to infinity or not can be modified if it improves a success rate of a compute environment. Other configurations of the described embodiments of the disclosure are part of the scope of this disclosure. Accordingly, the appended claims and their legal equivalents should only define the disclosure, rather than any specific examples given.

I claim:

1. A method of managing reservations in a multi-node compute environment, wherein users submits jobs to the multi-node compute environment for consuming compute resources in the multi-node compute environment according to a workload manager that establishes, at a first time, a reservation of compute resources in the multi-node compute environment for use by a job at a second time which is later than the first time, the method comprising:
   establishing a reservation mask for maintaining a guaranteed service level for first compute resources based on a request from a customer for compute resources within the multi-node compute environment, wherein the reservation mask slides a specified period of time ahead of a current time;
   making assignments of second compute resource requests to the reservation mask, wherein the second compute resource requests are permitted to access compute resources associated with the reservation mask; and
   modifying, based on information associated with the reservation mask, at least one of the specified period of time and the assignments.

2. The method of claim 1, wherein the information is received from the customer.

3. The method of claim 1, wherein the reservation mask is established based on a service level agreement with the customer and associated with the multi-node compute environment.

4. The method of claim 3, wherein the service level agreement indicates at least one of a compute resource type, a compute resource quantity, a maximum time required to provision requested compute resources, and the specified period of time.

5. The method of claim 1, wherein compute resources that are under the reservation mask are automatically removed from the reservation mask upon moving closer than the specified period of time to the current time.

6. The method of claim 1, wherein the customer has an associated authorization level, the method further comprising:
   establishing the reservation mask according to the associated authorization level.

7. The method of claim 1, wherein the information is based on at least one of a quality of service success rate, reported statistics, new customers to the multi-node compute environment, node failures, new resources available to the multi-node compute environment, system maintenance, backlog thresholds, administrative actions, and issues relates to peer-to-peer environments.

8. The method of claim 1, further comprising:
   modifying the specified period of time based on an analysis of an event history.

9. The method of claim 8, wherein the event history comprises at least one of quality of service success rates, utilization of the multi-node compute environment, responsiveness of the multi-node compute environment, and recorded statistics.

10. The method of claim 1, wherein the specified period of time is modified based on events related to a time associated with a job submission.

11. The method of claim 1, wherein the information is associated with a negotiation between two entities.

12. The method of claim 11, wherein the two entities comprise the multi-node compute environment and at least one of the user, a hosting center, a peer-to-peer workload manager, a group, and the job.

13. The method of claim 1, wherein the information is further associated with an offer from the customer to pay an additional amount for modifying the at least one of the specified period of time and the assignments.

14. The method of claim 1, wherein the assignments are modified, the method further comprising:
modifying at least one of processor nodes, bandwidth, licenses, memory, generic resources, and disk storage.

15. The method of claim 1, wherein the information is associated with at least one of a policy and a feedback loop.

16. The method of claim 1, wherein the information is associated with instructions for handling an exception to the guaranteed service level.

17. A system comprising:
a processor; and
a computer-readable storage medium storing instructions which, when executed by the processor, perform operations comprising:
establishing a reservation mask for maintaining a guaranteed service level for requests from a customer for compute resource within a multi-node compute environment,
wherein the reservation mask slides a specified period of time ahead of a current time, and wherein a user submits a job to the multi-node compute environment for consuming compute resources in the multi-node compute environment according to a workload manager that establishes, at a first time, a reservation of compute resources in the multi-node compute environment for use by the job at a second time which is later than the first time;
making assignments of compute resource requests to the reservation mask, wherein the compute resource requests are permitted to access the compute resources associated with the reservation mask;
receiving information associated with the reservation mask; and
modifying, based on the information, at least one of the specified period of time and the assignments.

18. The system of claim 17, wherein the information is associated with reducing the guaranteed service level due to the customer consuming a prepaid amount of compute resources.

19. A computer-readable storage device storing instructions which, when executed by a computing device, cause the computing device to perform operations comprising:
establishing a reservation mask for maintaining a guaranteed service level for requests from a customer for compute resource within a multi-node compute environment,
wherein the reservation mask slides a specified period of time ahead of a current time, and wherein a user submits a job to the multi-node compute environment for consuming compute resources in the multi-node compute environment according to a workload manager that establishes, at a first time, a reservation of compute resources in the multi-node compute environment for use by the job at a second time which is later than the first time;
making assignments of compute resource requests to the reservation mask, wherein the compute resource requests are permitted to access the compute resources associated with the reservation mask;
receiving information associated with the reservation mask; and
modifying, based on the information, at least one of the specified period of time and the assignments.

20. The computer-readable storage device of claim 19, wherein the computer-readable storage device stores instructions which, when executed by the processor, cause the processor to perform operations further comprising:
receiving a resource reservation request from an authorized user; and
implementing the resource reservation request according to an authorization level of the authorized user.

* * * * *